US006010788A

United States Patent [19]

Kebabjian et al.

[11] Patent Number: 6,010,788

[45] Date of Patent: Jan. 4, 2000

[54] HIGH SPEED DATA TRANSMISSION CABLE AND METHOD OF FORMING SAME

[75] Inventors: Matthew T. Kebabjian, Jacksonville; Jerry J. Kulaga, St. Augustine, both of Fla.

[73] Assignee: Tensolite Company, St. Augustine, Fla.

[21] Appl. No.: 08/991,730

[22] Filed: Dec. 16, 1997

[51] Int. Cl.[7] .......... B32B 15/00

[52] U.S. Cl. .......... 428/381; 428/373; 428/374; 428/377; 428/378; 428/383; 428/389; 428/397; 428/458; 428/480; 174/102 R; 174/103; 174/104; 174/105 R; 174/109; 174/110 FC; 174/110 SR; 174/110 PM

[58] Field of Search .......... 174/102 R, 103, 174/104, 105 R, 109, 110 FC, 110 SR, 110 PM; 428/373, 374, 377, 378, 381, 383, 389, 458, 480, 397

[56] References Cited

U.S. PATENT DOCUMENTS

| | | | |
|---|---|---|---|
| 220,944 | 10/1879 | Rogers et al. | 174/102 R |
| 290,122 | 12/1883 | Shaw | 174/102 R |
| 2,454,625 | 11/1948 | Bondon | 174/120 |
| 4,096,346 | 6/1978 | Stine et al. | 174/36 |
| 4,719,319 | 1/1988 | Tighe, Jr. | 174/103 |
| 4,965,412 | 10/1990 | Lai et al. | 174/107 |
| 5,216,202 | 6/1993 | Yoshida et al. | 174/36 |
| 5,329,064 | 7/1994 | Tash et al. | 174/36 |
| 5,574,250 | 11/1996 | Hardie et al. . | |

*Primary Examiner*—William Krynski
*Assistant Examiner*—Chris Cronin
*Attorney, Agent, or Firm*—Wood, Herron & Evans, LLP

[57] ABSTRACT

A high speed data transmission cable comprises a pair of primary cables positioned adjacent to each other along their lengths with each primary cable including a pair of generally parallel conductors coupled together and surrounded by insulation. A shield layer surrounds each primary cable along its length to isolate the primary cables from each other. The primary cables and corresponding shield layers are twisted together around a center axis and form a double helical structure, thereby providing improved transmission characteristics in the high speed data transmission cable.

33 Claims, 2 Drawing Sheets

HIGH SPEED DATA TRANSMISSION CABLE AND METHOD OF FORMING SAME

FIELD OF THE INVENTION

This invention relates generally to data transmission cables and more specifically to a high speed data transmission cable which has low signal skew and attenuation, is mechanically durable and is able to deliver more consistent data signals at high data rates.

BACKGROUND OF THE INVENTION

There is currently a demand for high speed data transmission cables which are capable of high-fidelity signal transmission at minimal signal attenuation. The ever-increasing use of high speed computer equipment and telecommunications equipment has increased such demand.

One existing cable product capable of high data rate transmission is fiber-optic cable which has good bandwidth performance over long distances. Furthermore, fiber-optic cables provide very low attenuation and little interference or noise with the transmitted signal. However, despite their desirable signal transmission qualities, fiber-optic cables are still very expensive. Furthermore, when transmission of signals over shorter distances is required, fiber-optic cables become even less desirable from an economic standpoint. For high speed data transmission over relatively short distances, such as up to 50 meters, copper based, differential signal transmission cables are the predominant choice in the industry.

Differential signal transmission involves the use of a cable having a parallel pair of conductors wherein the information or data which is transmitted is represented by a difference in voltage between the parallel conductors. The data is represented in transmission by polarity reversals on the conductor pair and the receiver or other equipment coupled to the receiving end of the cable determines the relative voltage difference between the conductors and the difference is analyzed to determine its logical value, such as a 0 or 1. Differential pairs may be shielded or unshielded. Shielded differential pairs generally perform better than unshielded pairs because the internal and external environments of the conductors are isolated. Improved attenuation performance also usually results with shielded cables.

Differential signal transmission cables have a variety of desirable electrical characteristics, including immunity to electrical noise or other electrical interferences. Since the differential signals transmitted are 180° out of phase to provide a balanced signal in the cable, and are considered to be complementary to one another, any noise will affect both of the conductors equally. Therefore, the differences in the signals between the conductor pairs due to external electrical noise and interference are generally negated, particularly for shielded pairs. It may also be true for unshielded differential pairs as well by varying the twisting of the pairs, for example. Differential signal transmission cables are also immune to cross-talk, that is, interference between the individual cables due to the signals on other cables which are bundled together into a multi-cable structure. Again, shielded differential pairs will generally outperform unshielded pairs with respect to cross-talk. Multiple differential signal cables in a larger overall cable structure are referred to as primary cables.

Since differential signal transmission relies upon parallel transmission of the data signal and comparison of the differences in those signals at the receiving end of the cable, it is desired that the corresponding signals of each pair arrive at the receiving end at the same time. Because of insulative property differences experienced by each conductor of a cable pair, such as differences due to dielectric inconsistencies and/or physical characteristics of the cable, differential signal transmission cables are subject to signal skew. Signal skew is defined as the delay of the arrival of one of the corresponding or complimentary signals at the receiving end with respect to the other signal. In simpler terms, one complimentary signal arrives at the receiving end faster than the other signal, a condition which is exaggerated as cable length increases. Generally, a signal skew budget is designed into data transmission systems and the cables which link the systems are allowed only a portion of the budget.

Therefore, signal skew is one of the important parameters which must be considered when using a differential signal transmission cable. As will be appreciated, it is desirable to keep signal skew in a cable to a minimum to prevent errors in communication. Furthermore, low signal skew is necessary for proper cancellation of noise, because if the two opposing signals do not arrive at the receiving end at the same time, a certain amount of the noise in the cable will not be cancelled. A lower signal skew will also minimize jitter, the amount of real time it takes for the signal rising and falling edges to cross, which allows a differential signal transmission cable to be utilized at greater lengths or distances. It is therefore desirable to utilize a data transmission cable having a relatively low signal skew.

Another desirable characteristic in differential signal data transmission cables is low attenuation. Attenuation will generally be affected by the physical structure of the cable, which includes the shield type and design, the dielectric material type, and the conductor type, the position of the conductors, and the electrical interaction between the conductors of a cable. If the primaries are poorly constructed, the dielectric material properties, conductor-to-dielectric geometry, and hence impedance characteristics, may vary along its length, thus increasing its signal attenuation or loss characteristics when the cable is subjected to use. Accordingly, it is desirable to utilize a cable which has low attenuation characteristics at the desired operating frequency, so that cable length can be maximized, and also a cable which maintains a constant, low attenuation characteristic during use.

To that end, it is further desirable to maintain the conductors in consistent positions within the insulation and with respect to one another. It is also desirable to maintain consistent dielectric properties of the cable insulation along its length to reduce impedance variations and hence reduce attenuation and signal skew. At the same time, high speed data transmission cables should be flexible and able to withstand the mechanical abuses associated with usage. For example, the distance between the primaries, as well as the distance from the center of each primary to the outer surface of the dielectric, should be consistent along the length of the cable.

Accordingly, it is an objective of the present invention to provide a high-speed data transmission cable which produces relatively low signal skew, and minimizes signal attenuation within a high-speed data transmission cable at the particular driven frequencies of the cable.

It is still a further objective of the present invention to provide a high-speed data transmission cable which can be used at greater lengths than the present high speed data cables.

It is still a further objective of the invention to maintain the integrity of the data signal transmitted through the cable and to thus minimize the delay, distortion and attenuation of that signal.

It is another objective of the present invention to provide a flexible and durable high-speed data transmission cable which maintains a more consistent dielectric constant along its length.

SUMMARY OF THE INVENTION

The high speed data transmission cable of the present invention utilizes individually shielded primary cables which provide high speed data transmission with relatively low signal skew. The inventive cable minimizes signal attenuation and maintains the integrity of the data signal transmitted while providing a flexible and durable cable which can be used at lengths greater than the lengths normally required for existing cables.

More specifically, the high speed data transmission cable comprises a pair of primary cables which extend generally adjacent to each other along their lengths and are bundled into an overall cable structure by a first overall shield of aluminum mylar tape, a second overall shield of braided tinned copper, and an outer jacket formed of a suitable insulating plastic, such as vinyl. Preferably each of the primary cables includes a pair of generally parallel conductors which are coupled together and surrounded by the same layer of insulation. The layer of insulation around the conductors is generally formed to have a FIG. 8 cross-section which maintains each of the conductors in a precise and desired position within each primary cable, although other cross-sectional shapes, such as rectangular, may be utilized for the insulation layer. Furthermore, each conductor might be individually insulated. In a preferred embodiment, the primary cable insulation is an extruded, expanded PTFE (ePTFE).

In accordance with the principles of the present invention, a shield layer surrounds each primary cable along its length within the overall transmission cable structure to isolate the primary cables from each other and for improved transmission characteristics of the transmission cable. Specifically, each primary cable is individually shielded with a shield structure that has a metal layer and a polyester layer. In a preferred embodiment of the invention, an aluminum-polyester tape is wrapped around each primary in an overlapped fashion to form the shield. Preferably, the aluminum-polyester tape includes a mylar layer with a layer of aluminum covering a portion of the mylar layer wherein the edges of the tape are maintained generally free of aluminum. The shield tape is wrapped around each primary cable with the aluminum layer facing inwardly against the primary cable ePTFE insulation. The tape is wrapped with a helically overlapping scheme so that the aluminum layers of adjacent tape turns overlap to form a generally continuous metal shield along the length of each primary cable.

In accordance with the present invention, the primary cables are constructed and bound together to achieve low signal skew and attenuation. After the shield layer has been applied to each primary cable, the primary cables will have a generally bar-like shape. The bar-like primary cables are then positioned flat against each other and are twisted together around a common axis to form a double helical or helix structure. It has been discovered that the unique construction of the cable, including the positioning of the various shield and insulation layers and the subsequent twisting of the primary cables after application of the individual primary shields, will create a cable where the insulation of the primary cables is locked into a more positive position around the conductors. The invention thus creates a more consistent effective dielectric constant along the long cable axis. Still further, with the inventive cable, the differential signal skew and signal attenuation are minimized, while the integrity of the transmitted signal, as measured by the output eye-pattern of the signal is maximized. As such, the cable can be used in longer lengths than would be possible for prior art differential signal cables.

Furthermore, the aluminum-mylar tape shield wrapped around each pair with the aluminum side toward the primary cable insulation, isolates each pair more effectively to reduce cross-talk interference between the primary cables. The primary shields are maintained electrically floating and the high frequency electromagnetic fields generated by each primary cable are enclosed to reduce interference between the primary cables. Shield effectiveness as well as transfer impedance are improved significantly over present designs. After the primary cables have been shielded and twisted in accordance with the principles of the present invention, the first and second overall shields are applied and then the insulative plastic jacket is applied to provide the finished high-speed data transmission cable of the invention.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

DETAILED DESCRIPTION OF THE INVENTION

Figure 1:
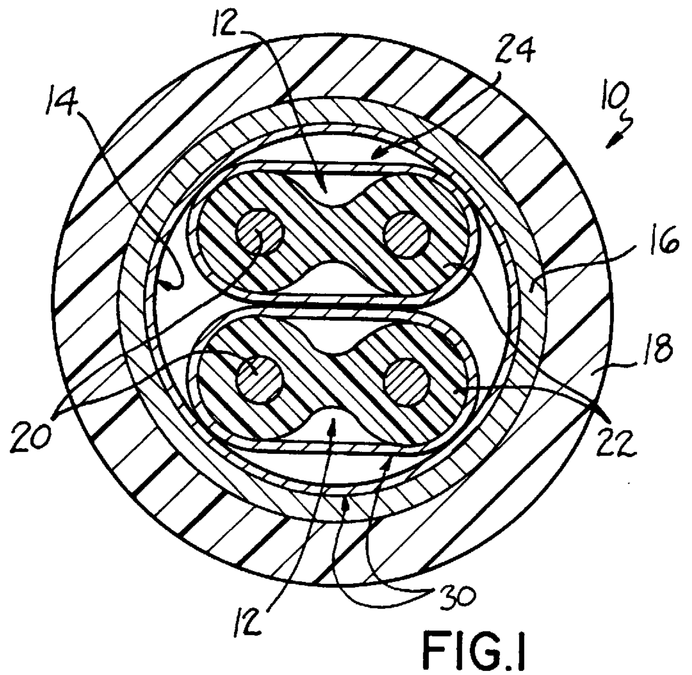
FIG. 1 is a cross-section of the inventive cable of the invention.
Figure 2:
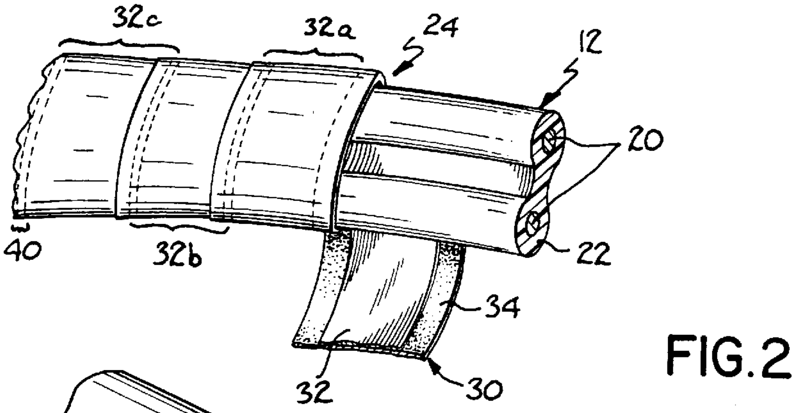
FIG. 2 is a side view of primary cable of the inventive cable shown wrapped with the shield.
Figure 3:
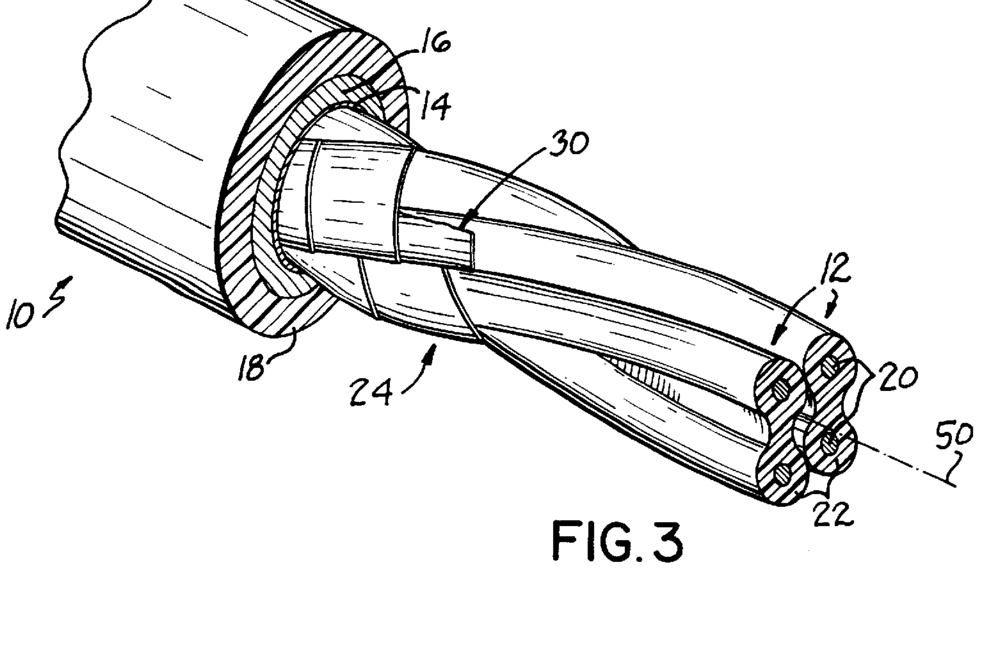
FIG. 3 is a perspective view of primary cables of the inventive cable, shown wrapped into the overall cable pairs about a center longitudinal axis.

FIG. 1 illustrates a cross-sectional view of the high-speed data transmission cable of the present invention. Cable or cable structure 10 comprises a pair of primary cables 12 which are oriented flat against each other and are surrounded by a first overall shield 14, a second overall shield 16, and a plastic insulative jacket 18. Each primary cable 12 comprises a pair of conductors 20 surrounded by an insulation layer 22 having a FIG. 8 cross-section and a primary shield 24 in accordance with the principles of the present invention. As illustrated in FIGS. 2 and 3, each of the primary cables is twisted, generally along the entire length of the cable.

Figure 1A:
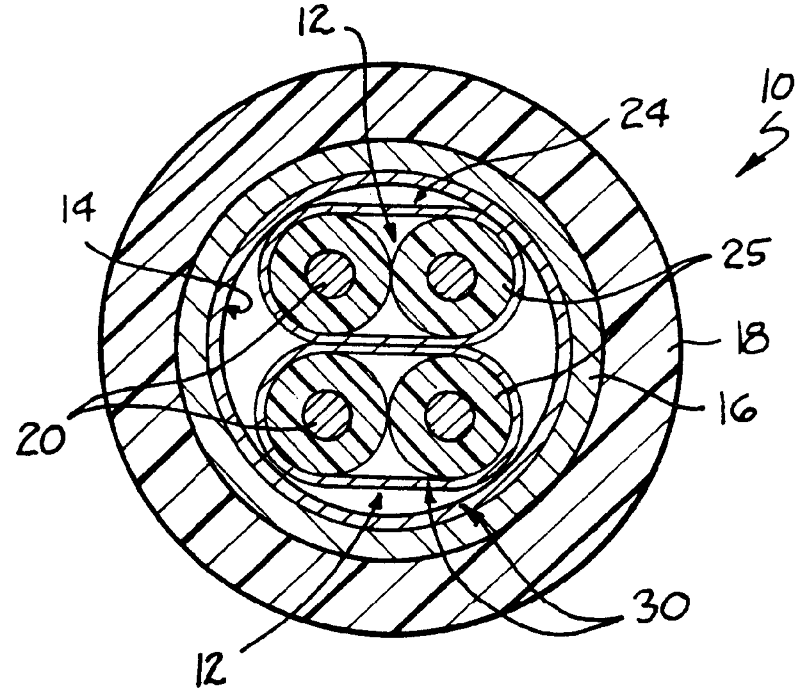
FIG. 1A is a cross-section of another embodiment of the inventive cable.
Figure 1B:
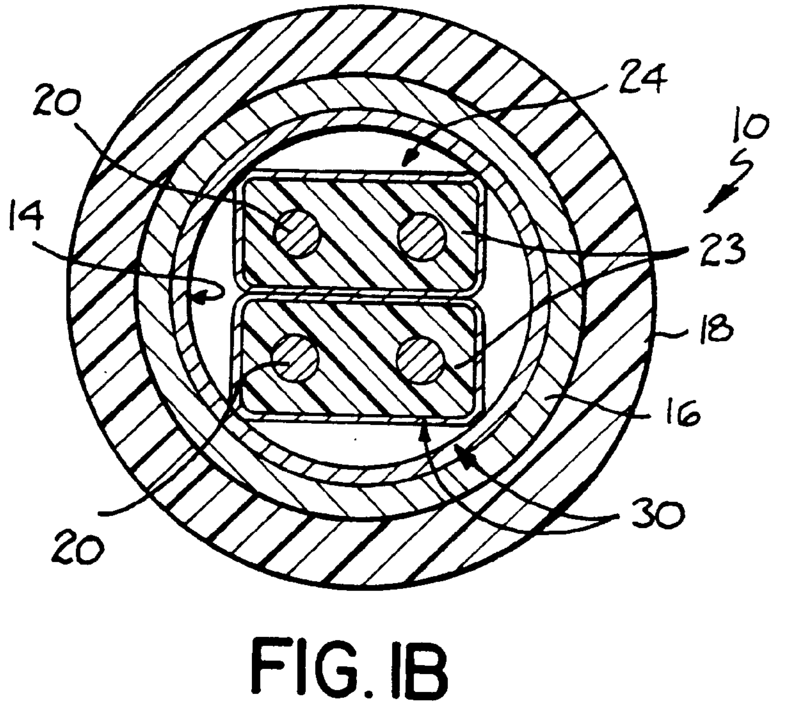
FIG. 1B is a cross-section of another embodiment of the inventive cable.

While FIG. 1 shows the conductors of the primary coupled together with a FIG. 8 cross-section, the conductors might also be separately insulated or insulated with a different shape of insulation. For example, the conductors 20 of FIG. 1B are shown positioned in an insulation layer 23 having a rectangular cross-section. Layer 23 could also have an oval cross-section or some other shape. Furthermore, the individual conductors 20 might also be insulated discretely from each other as shown in FIG. 1A. The conductors are each surrounded by an insulation layer 25, which layers are not coupled together directly.

The outside insulative jacket 18 of cable 10 is formed of a suitable plastic, such as vinyl, for providing electrical insulation of the cable as well as a damage resistant outer structure. Other suitable plastic jackets may be formed of any thermoplastic or fibrous material, e.g. polyethylene, polypropylene, FEP, extruded or wrapped PTFE or braided fiberglass. The first overall shield, which is electrically grounded in the cable, comprises a layer of polyester and a layer of metal.

Figure 4:
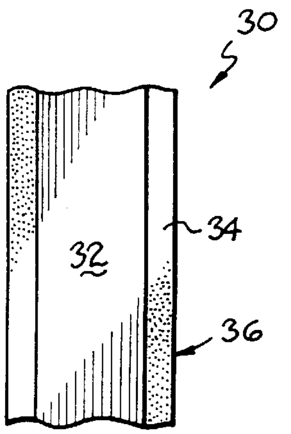
FIG. 4 is a partial top view of the polyester-metal tape utilized to form the primary shield of the present invention.

In a preferred embodiment of the invention, the first overall shield 14 is formed by wrapping a tape structure having a layer of mylar and a layer of aluminum on one side of the mylar layer around the internal primary cables 12 with sufficient overlap to form a continuous shield of the metal layer. Mylar is a well-known PET or polyethylene terephthalate. Referring to FIG. 4, a tape structure 30 including a polyester layer and a metal layer is shown which may be utilized to form shield 14. Preferably, the tape is an aluminum-mylar tape. As discussed further hereinbelow, the tape structure 30 is also utilized for forming the shields 24 around the primary cables. Tape 30 includes an aluminum layer 32 generally in the center of the tape, and formed on one side of the mylar layer 34. The edges 36 of tape 30 are generally free of aluminum. However, to form the first overall shield 14 of cable 10, a polyester-metal tape having a layer of metal which is generally co-extensive with one side of the polyester tape may also be utilized to form shield 14. Preferably, the tape is wrapped so that the metal layer of shield 14 faces outwardly away from the primary cables and toward the second overall shield 16.

The second overall shield 16 is preferably formed of a braided, tinned copper, and generally surrounds the primary cables 12 and shield 14 along their entire lengths. Jacket 18 is then positioned around the second overall shield 16. While preferred embodiments of the first and second overall shields 14 and 16 are disclosed, other shield structures might also be utilized, such as shields formed of helically wrapped copper foil, copper-mylar tape, or braided, silver plated copper. The second overall shield 16 is preferably electrically grounded by being connected to a ground source (not shown).

Before applying the shields 14, 16 and jacket 18, the primary cables are shielded first and then twisted together in accordance with the principles of the present invention. Turning now to the primary cables 12, each primary cable 12 includes a pair of parallel spaced conductors 20. The conductors are formed of any suitable conductive metal utilized for such cable structures, such as copper or an alloy containing copper. The conductors may be solid, as shown, or may be made of smaller individual strands. The parallel conductors are coupled together and surrounded by a layer of insulation, such as layers 22, 23, or 25, which maintains the conductors in a precise location with respect to each other within the primary cable. In one embodiment, the insulation layer 22 comprises a layer formed onto the conductors to have generally a FIG. 8 cross-section as illustrated in FIG. 1. In other embodiments, the cross-sectional shape could be rectangular or some other shape (See FIG. 1A), or could be discrete and generally circular as shown in FIG. 1B. Referring to FIG. 1, insulation layer 22 is extruded onto the conductors 20 utilizing an extrusion process which is known in the art. Each of the conductors 20 is maintained within an end of the FIG. 8 or other insulation layer and the primary cables, as seen in FIGS. 1, 1A, 1B, and 2 will have a bar-like shape before being twisted in accordance with the invention.

After the primary cables have been individually shielded as discussed further below, the primary cables are positioned generally flat against each other and are twisted along their lengths and around a common axis, as shown in FIG. 3, to form a compact cable 10 with a double helix structure. The shields 14, 16, and the outer insulation jacket 18 are then applied. The conductors may be whatever gauge is necessary for the cable. However, 22 AWG is one preferable size. As shown in FIG. 3, the twisted primaries 12 form a double helical structure or double helix.

In accordance with the principles of the present invention, the primary shields 24 for each primary cable comprise a polyester layer and a metal layer which is formed on each primary cable 12 to create a generally continuous metal shield along the length of the cable 10. The shield is formed with the metal layer facing inwardly toward the insulation layer 22 and the polyester layer facing outwardly toward the first overall shield 14. Therefore, the metal layer is between the polyester layer and the insulation 22. One suitable primary shield layer 24 utilizes a layer of mylar in combination with a layer of aluminum, with the aluminum facing inwardly toward the insulation layer 22 of the primary cable 12.

FIG. 4 illustrates a mylar-aluminum tape structure which may be used to form shield layer 24 in accordance with one embodiment of the present invention. Tape 30 includes a mylar layer 34 having a strip or layer of aluminum 32 placed on one side of the mylar layer 34. Preferably, the tape 30 only has aluminum on a center portion thereof, and the edges 36 of the tape are mylar, which is generally free of the aluminum layer 32.

Referring to FIG. 2, tape 30 is wrapped around each bar-shaped primary cable 12 in a series of turns. The adjacent turns of tape 30 are helically overlapped such that the aluminum layers of each turn, indicated by reference numerals 32*a*, 32*b*, and 32*c*, overlap along the length of the primary cable 12. Referring to FIG. 2, it may be seen that the wrapped turns of each tape are made such that aluminum layer 32*a* overlaps with the aluminum layer 32*b* of the adjacent turn. Similarly, layer 32*b* overlaps with layer 32*c*, and so on. In that way, an overlapped section of the aluminum layers is formed to create a metal overlap section 40 (see FIG. 2). Accordingly, the metal shield, and preferably aluminum shield 24, is formed along the length of the primary cable 12 as a continuous shield along the cable 12. The metal layer of tape 30 faces inwardly toward the insulation layer 22 of each primary cable 12. In that way, the polyester layer 34 faces outwardly and thus forms an outer continuous polyester layer along the outside of each primary cable. The outer polyester layer electrically insulates the metal conductive layer 32 from the first overall shield 14. Thus, as mentioned above, the primary shield layer 24 is electrically floating with respect to shield 14.

One suitable aluminum-mylar tape product is available from Neptco of Pawtucket, R.I. The tape comes in various widths, whereas one suitable width for the tape of the disclosed embodiment is relatively narrow and is approximately 0.5 inches wide. The tape available from Neptco has a mylar layer which is 0.7 mil thick, coupled with an aluminum layer which is 0.8 mil thick. Therefore, the overall tape, when wrapped around each primary cable forms a shield layer 24 having a thickness of approximately 2–3 mils. A wrap structure of approximately twenty-five turns per foot at an angle of wrap of approximately 50° has been found suitable for forming the shield layer 24 of the invention. The inventor has found that wrapping the primaries with the relatively narrow tape provides better performance in the inventive cable than wider tape. The narrow tape provides a primary cable that is easier to twist together with another primary cable, thus minimizing mechanical distortion. This tends to make the electrical performance more consistent from foot to foot. Wider tape wraps faster, but provides a product with a less consistent performance.

Although one type of wrapping scenario is disclosed, other types may be utilized. For example, different helical wrapping angles between 1°–89° might be utilized. Furthermore, a longitudinal wrap, also known as a cigarette fold wrap, might be utilized for shielding the individual cables.

Turning to FIG. 3, the primary cables 12 are each individually wrapped with aluminum-mylar tape 30 to first form shield layer 24. The primaries are then placed side-by-side and twisted together to form a double helix structure which forms the round cable. That is, the primary cables are twisted after the shield layers 24 have been formed thereon. FIG. 3 illustrates the double helix where the two primary cables 12 lie flat against each other and are twisted together to be intertwined along their lengths. The two pairs are twisted together into the double helix structure about a common center longitudinal axis 50. It has been discovered, as an aspect of the invention, that by wrapping each primary cable first with the aluminum-mylar tape to form shield 24 and then subsequently twisting the primary, either in single pass or separate passes through the process, the expanded PTFE dielectric insulation layer 22 is locked more positively within the twisted primary cable structures to yield a more consistent effective dielectric constant along the long axis of cable 12. The primary cables 12 are preferably twisted in the same direction that the tape 30 was wrapped when forming shield layer 24. In that way, the shield 24 effectively tightens further around the primary cables and further locks the insulation layer 22 of the primary cables into position within cable structure 10. Cable 10 of the present invention provides reduced differential signal skew, reduced signal attenuation, and further maintains the integrity of the transmitted signal by maximizing the potential output eye-pattern of the transmitted signal over greater cable lengths.

In order to reduce signal skew, it is important to maintain the dielectric constant of the insulation layer 22 generally consistent along its length. A variation in the dielectric constant as seen by either of the conductors 20 with respect to the other conductor will produce a delay or skew in the propagation of the differential transmission signal along the primary cable. As discussed above, it has been discovered that the double helical structure that is formed by the twisting of the primary cables together and the twisting of the unique shields 24 surrounding the primary cables 12 of the present invention, provides a greater consistency to the effective dielectric constant along the length of each primary cable, thus reducing signal skew. A suitable material for the extruded insulation layer 22 is expanded PTFE or ePTFE. While a preferred embodiment of the invention utilizes the expanded PTFE, other suitable insulation materials might be formed or cellular polyethylene or FEP.

As shown, each primary cable 12 includes its own shield or shield layer 24 to surround the primary cable. The shield layer 24 extends along the entire length of the primary cable 12 and is operable for electrically electrically isolating each primary cable from the other primary cable within the overall structure 10. The high-speed data transmission cable 10 formed in accordance with the principles of the present invention as disclosed herein provides a substantial improvement in the differential signal skew and minimizes the signal attenuation at the driven frequencies of the cable. Furthermore, the improvement in the differential signal skew and the attenuation characteristics of cable 10 allows the cable to be utilized at greater lengths than is typical for prior art differential signal cables. Still further, the individual shields 24 around the primaries substantially reduce the cross-talk between the primary cables, and thus isolates each primary cable more effectively from the other primary cable and also from interference coming from outside of the cable structure 10. High frequency electromagnetic fields generated by each primary cable are enclosed to thus reduce the interference between the primary cables 12. More specifically, the currents induced in the shield by the high frequency EM fields are enclosed within the primary cables 12. It has been determined that the invention provides a reduction of interference even though the primary shields 24 are not terminated to ground for electromagnetic current dissipation. The primary shields do not make electrical contact with any of the overall shields, and thus they are generally floating, in an electrical sense. It has been discovered that when the primary shield is grounded by means of a drain wire within each primary cable, performance tends to be unaffected.

Available prior art cables designed for data transmission but having a different design will typically show significantly higher attenuation than the inventive cable. One such cable places two pairs side-by-side and then diagonally excites the individual conductors of the cable. Comparing such a cable to the inventive cable for the same conductor size, 22 AWG solid, 150 Ω cable, driven at 531 MHZ (1,0625 Giga bits per second, or Gbaud) the inventive Z-Skew™ cable will have attenuation of approximately −8.5 dB/100 feet, whereas the prior art cable will have attenuation of approximately −11.0 dB/100 feet. Eye diagram performance (discussed below) when the inventive cables are driven at 1.0625 Giga bits per second, approximately $2\times10^{23}$ baud rate and 1.1 volts input voltage, will be about 310–320 mV output measured at 60% of the output period (941 picoseconds) for the inventive cable versus about 280–290 mV for the prior art cable at 30 meters (98.5 ft.) of cable. Performance specifications require a 400 mV minimum. Therefore, both the inventive and prior art cables will have to be equalized or filtered to produce a wide enough eye diagram.

Because the inventive cable will typically have about a 10% better performance, it has been demonstrated to be sufficiently driven at approximately a 10% or greater length. Furthermore, the inventive Z-Skew™ cable performs to required specifications for high-speed data transmission cables up to approximately 35–36 meters whereas the prior art cable will only operate up to around 30 meters. It should be noted that the specification is written around a 33 meter length.

Skew is specified for the complete data transmission assembly regardless of cable length, and is 180 picoseconds (ps) per assembly. Comparing equivalent length and gauge sizes, the prior art cable will generally have skew in the 150 ps range. The inventive Z-Skew™ cable will typically be around ⅓ of that or less; i.e., approximately 50 ps or less.

With respect to cross talk, the inventive cable performance will be approximately −65 dB. The prior art cable, on the other hand, has a cross talk performance value of approximately −50 dB. The inventive cable displays enhanced shield effectiveness and superior transfer impedance characteristics than prior art cables.

The inventive Z-Skew™ cables are first shielded and then further formed by twisting the primary cables together. The pairs are twisted to form a full duplex cable in a double helix geometry, which enhances the electrical performance as discussed above.

The eye-pattern is a measurement of the amount of signal which is transmitted through the cable for the purposes of triggering components at the receiving end. The eye-pattern is formed by a 1.1 volt peak-to-peak signal at 1.0625 Gigabits per second. (531.125 MHZ) sent through the cable and received at the other end. Cable 10 of the present invention is capable of handling transmission rates in the order of $2\times10^{23}$ bits per second. Furthermore, cable 10 may be utilized at greater lengths than prior art cables, including lengths in the range of 1–117 feet.

For forming the inventive cable, a bow twister or drum twister is utilized. Preferably, the individual primary cables are wrapped first in a separate step to form the shields 24 and are then twisted together into the double helix in a second, separate step. The bow twister's design, however, does allow wrapping of the cables in line with the twisting operation, if desired. Essentially, the twisting action of the cabling provides a way of wrapping th e cable in line. Standard planetary cablers or tubular stranders generally do not allow formation of the rectangular or oval shaped primaries into the double helical structure or double helix, because they tend to back twist the component cables individually first. Therefore, two individually twisted cables which are twisted around each other results instead of the circular cross-section double helical cable of the invention.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A high speed data transmission cable comprising:

a pair of primary cables, each primary cable including a pair of generally parallel conductors, the conductors each surrounded by insulation and positioned adjacent to each other to form a bar-shaped primary cable defining a cross-sectional latitudinal axis;

a shield layer surrounding each primary cable along its length to isolate the primary cables from each other;

the bar-shaped primary cables positioned generally flat against each other along their lengths such that the cross-sectional latitudinal axes of the primary cables are generally parallel with each other;

the bar-shaped primary cables and corresponding shield layers being twisted together around a common center longitudinal axis and forming a double helical structure wherein the bar-shaped primary cables are intertwined along their lengths and their cross-sectional latitudinal axes are maintained generally parallel along their lengths;

thereby providing improved transmission characteristics in the high speed data transmission cable.

2. The transmission cable of claim 1 wherein said shield layer comprises a polyester layer and a metal layer adjacent at least one side of the polyester layer.

3. The transmission cable of claim 2 wherein the polyester layer includes PET.

4. The transmission cable of claim 2 wherein the metal layer includes aluminum.

5. The transmission cable of claim 2 wherein said layer of metal is positioned between said polyester layer and the primary cable.

6. The transmission cable of claim 1 wherein the shield layer is formed by a shield tape wrapped in an overlapping fashion around the primary cable.

7. The transmission cable of claim 6 wherein said tape comprises a polyester layer and a metal layer adjacent at least one side of the polyester layer.

8. The transmission cable of claim 7 wherein said metal layer is coextensive with a portion of the polyester layer, at least one outer edge of the tape being generally free from the metal layer.

9. The transmission cable of claim 7 wherein the metal layers of adjacent turns of the tape are overlapped for providing a generally continuous metal shield along th e primary cable.

10. The transmission cable of claim 1 further comprising a first overall shield layer surrounding said primary cables.

11. The transmission cable of claim 10 wherein the first overall shield layer comprises a polyester layer and a metal layer adjacent at least one side of the polyester layer.

12. The transmission cable of claim 10 further comprising a second overall shield layer surrounding said primary cables.

13. The transmission cable of claim 12 wherein the second overall shield layer comprises a copper layer.

14. The transmission cable of claim 1 further comprising an outer jacket surrounding said primary cables.

15. The transmission cable of claim 1 wherein said insulation surrounding the primary conductors includes PTFE.

16. A high speed data transmission cable comprising:

a pair of primary cables, each primary cable including a pair of generally parallel conductors, the conductors each surrounded by insulation and positioned adjacent to each other for form a bar-shaped primary cable defining a cross-sectional latitudinal axis;

a shield layer surrounding each primary cable along its length to isolate the primary cables from each other, the shield layer comprising a polyester layer and a metal layer adjacent at least one side of the polyester layer;

the bar-shaped primary cables positioned generally flat against each other along their lengths such that the cross-sectional latitudinal axes of the primary cables are generally parallel with each other;

the bar-shaped primary cables and corresponding shield layers being twisted together around a common center longitudinal axis and forming a double helical structure wherein the bar-shaped primary cables are intertwined along their lengths and their cross-sectional latitudinal axes are maintained generally parallel along their lengths;

thereby providing improved transmission characteristics in the high speed data transmission cable.

17. The transmission cable of claim 16 wherein the polyester layer includes PET.

18. The transmission cable of claim 16 wherein the metal layer includes aluminum.

19. The transmission cable of claim 16 wherein the shield layer is formed by a shield tape wrapped in an overlapping fashion around the primary cable.

20. The transmission cable of claim 19 wherein said metal layer is coextensive with a portion of the polyester layer, at least one outer edge of the tape being generally free from the metal layer.

21. The transmission cable of claim 19 wherein the metal layers of adjacent turns of the tape are overlapped for providing a generally continuous metal shield along the primary.

22. The transmission cable of claim 16 wherein said layer of metal is positioned between said polyester layer and the primary cable.

23. A method of forming a high speed data transmission cable comprising the steps of:

providing a pair of primary cables with each primary cable including a pair of generally parallel conductors, the conductors each surrounded by insulation and positioned adjacent to each other to form a bar-shaped primary cable defining a cross-sectional latitudinal axis;

forming a shield layer around each primary cable along its length to isolate the primary cables from each other;

arranging the bar-shaped primary cables to be generally flat against each other along their lengths such that the cross-sectional latitudinal axes of the primary cables are generally parallel with each other;

twisting the bar-shaped primary cables and corresponding shields together around a common center longitudinal axis to form a double helical structure and to tighten the shield layer therearound and intertwine the bar-shaped primary cables along their lengths for providing improved transmission characteristics in the primary cables;

maintaining the cross-sectional latitudinal axes of the primary cables generally parallel along the length of the twisted primaries;

binding the twisted primary cables together to form the high speed data transmission cable.

24. The method of claim 23 wherein said shield layer comprises a polyester layer and a metal layer adjacent at least one side of the polyester layer.

25. The method of claim 24 wherein the polyester layer includes PET.

26. The method of claim 24 wherein the metal layer includes aluminum.

27. The method of claim 24 further comprising positioning the layer of metal between said polyester layer and the primary cable.

28. The method of claim 23 further comprising forming the shield by wrapping the primary cable with a shield tape in an overlapping fashion around the primary.

29. The method of claim 28 wherein said tape comprises a polyester layer and a metal layer adjacent at least one side of the polyester layer.

30. The method of claim 29 further comprising wrapping the shield tape so that metal layers of adjacent turns of the tape are overlapped for providing a generally continuous metal shield along the primary cable.

31. The method of claim 23 further comprising binding the primary cables together with a first overall shield layer surrounding said primary cables.

32. The method of claim 31 further comprising binding the primary cables together with a second overall shield layer surrounding the first overall shield and the primary cables.

33. The method of claim 23 further comprising binding the primary cables together with an outer jacket surrounding said primary cables.

* * * * *

UNITED STATES PATENT AND TRADEMARK OFFICE

CERTIFICATE OF CORRECTION

PATENT NO. : 6,010,788

DATED : January 4, 2000

INVENTOR(S) : Matthew T. Kebabjian and Jerry J. Kulaga

It is certified that error appears in the above-identified patent and that said Letters Patent is hereby corrected as shown below:

In Column 3, line 25, delete "FIG. 8" and insert --figure 8--.

In Column 4, lines 53 and 58, delete "FIG. 8" and insert --figure 8--.

In Column 5, lines 55 and 62, delete "FIG. 8" and insert --figure 8--.

Signed and Sealed this

Third Day of April, 2001

*Attest:*

Nicholas P. Godici

NICHOLAS P. GODICI

*Attesting Officer*

*Acting Director of the United States Patent and Trademark Office*